United States Patent [19]

Harrington

[11] E Re. 30,558

[45] Reissued Mar. 31, 1981

[54] INTEGRAL CIGARETTE PAPER HOLDER ELEMENT

[76] Inventor: Duane E. Harrington, 365 Crestmont Dr., San Francisco, Calif. 94131

[21] Appl. No.: 74,390

[22] Filed: Sep. 10, 1979

Related U.S. Patent Documents

Reissue of:

[64] Patent No.: 4,033,358
Issued: Jul. 5, 1977
Appl. No.: 674,213
Filed: Apr. 6, 1976

[51] Int. Cl.[3] ..... A24D 1/08; A24F 9/14

[52] U.S. Cl. ..... 131/15 R; 131/260

[58] Field of Search ..... 131/260, 257–259, 131/15 R, 15 A, 4 R, 7 A, 174

[56] References Cited

U.S. PATENT DOCUMENTS

| | | | |
|---|---|---|---|
| 554,310 | 1/1896 | Minck | 131/4 A |
| 680,003 | 8/1901 | Simmering | 131/15 R |
| 820,570 | 5/1906 | Hammond | 131/257 |
| 889,207 | 6/1908 | Crane | 131/257 X |
| 1,189,878 | 7/1916 | Schwartz | 131/174 |
| 1,858,951 | 5/1932 | Charley | 131/4 R X |
| 2,666,437 | 1/1954 | Lattof | 131/15 R |
| 3,512,538 | 5/1970 | Sledge | 131/15 R |
| 3,736,940 | 6/1973 | Pastou | 131/15 A X |

FOREIGN PATENT DOCUMENTS

| | | | |
|---|---|---|---|
| 22161 | of 1901 | United Kingdom | 131/4 A |
| 863398 | 3/1961 | United Kingdom . | |
| 1170817 | 11/1969 | United Kingdom . | |
| 1249755 | 9/1971 | United Kingdom . | |

*Primary Examiner*—Stephen C. Pellegrino
*Attorney, Agent, or Firm*—Bielen and Peterson

[57] ABSTRACT

Cigarette paper with an integral support for holding a cigarette that has been consumed in substantial part, comprising a deformable wire incorporated longitudinally along the length of the paper containing the smoking medium, the wire being exposed for manipulation into a finger supported holder for the remainder of the cigarette.

6 Claims, 8 Drawing Figures

INTEGRAL CIGARETTE PAPER HOLDER ELEMENT

Matter enclosed in heavy brackets [ ] appears in the original patent but forms no part of this reissue specification; matter printed in italics indicates the additions made by reissue.

BACKGROUND OF THE INVENTION

This invention relates to smoking devices and in particular to holders or supports for paper enclosed smoking mediums such as tobacco, nicotine-free lettuces and other herbs.

Smoking containers for tobaccos have been used long before the discovery of the New World of Europeans.

Hollow reeds and corn husks were used by the natives of Central America as containers for crushed tobacco leaves. The tobacco-leaf wrapped cigar was, however, the smoking mode introduced among the upper classes of Europe by the Spaniards. The beggars of Seville are credited with devising the paper wrapped cigarette from discarded cigar butts, which were shredded and wrapped in scraps of paper.

Cigarette smoking was not widely popularized until the middle of the nineteenth century. Initially all cigarettes were hand holled whether factory packed or rolled by the user. Because of their fine linen-composition paper, the French became dominant in the supply of paper for the cigarette market, a dominance that has persisted to this day.

As accessories to cigarettes and the like became popular, a wide variety of holders and supports have been devised. The majority of holders are not discardable and hence must be carried on the person, a practice that may be a nuisance and an inconvenience. The principal advantage of the present holder is that it is incorporated directly into the paper and hence is not carried separately. Further, because of the very minor additional cost, the holder is discardable.

SUMMARY OF THE INVENTION

The cigarette holder of this invention comprises a semi-rigid noncombustible linear element attached to the cigarette paper along the length of the cigarette. While the element may extend beyond the length of the cigarette, it is preferred that the element be equal to the length of the paper for convenience of manufacture and packaging. The element is not immediately useable on smoking the cigarette, but rather becomes exposed as the cigarette is consumed. At some point of consumption, for example, half or more of the cigarette, the element is sufficiently exposed to be grasped by the fingers of the smoker for consumption of the remainder of the cigarette as desired. Preferably, the element is deformable such that the exposed portion of the element may be bent at a right angle to the length of the cigarette for a more convenient support of the cigarette.

The support element may be positioned along the length of the paper at any position across the width of the paper. For papers which are marketed for users who roll their own, it is preferred that the element be located along the edge of the paper which aids in the hand rolling of the cigarette. Where cigarettes are commercially rolled by machine, it is preferred that the element be located away from the edge, since machine rolled cigarettes use a minimal overlap of opposite edges in forming the cigarette tube.

A preferred embodiment of the support element comprises a thin stainless steel wire. The material is noncontaminating and dissipates heat within a short length, thereby allowing for comfortable finger support of the exposed end of the wire.

The wire is fastened to the paper by an adhesive preferably in a tuck and roll of the edge of the paper around the wire or an overlap of the paper over the wire. This can be accomplished in a continuous process for a large roll of cigarette paper before the paper is cut into separate leaves.

In other embodiments, the support element may be deposited on the paper in a liquid or semiliquid state to form a bead of material that either hardens immediately or hardens by exposure to the ember during smoking to a rigid or semirigid element. Because of the contamination problem, this embodiment is secondary to the preferred use of a stainless steel wire element.

These and other features will become apparent from the detailed description of the invention herein.

DETAILED DESCRIPTION OF THE PREFERRED EMBODIMENTS

Figure 1:
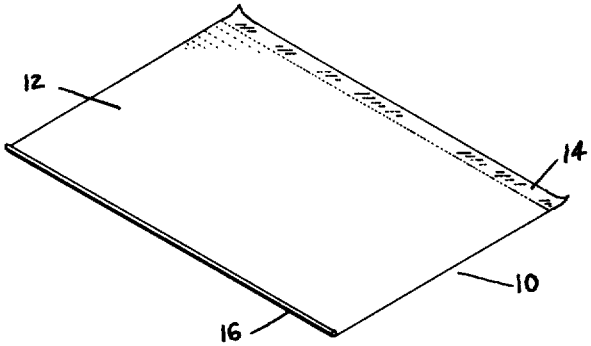
FIG. 1 is a perspective view of a cigarette paper including a wire support element along one longitudinal edge.

Referring to the drawings, the cigarette paper with incorporated wire for support comprising this invention, designated generally by the referenced numeral 10 is shown in the perspective view of FIG. 1. The paper 10 is shown cut into a conventional size paper leaf 12 having a gummed edge 14 along one edge of the leaf 12 and a thin, deformable wire element 16 along the opposite edge of the leaf. The wire element or wire 16 is encased along the edge of the paper leaf and secured thereto by an adhesive. Preferably, the wire is comprised of a stainless steel material. Other noncombustible semirigid materials may be used provided they do not expose the smoker to harmful or disagreeable contaminants. The diameter of the wire may be varied within natural limits. A diameter of 10 thousandths of an inch has been found to be most satisfactory for a stainless steel wire for its properties in dissipating heat and providing a stable holder or support element when exposed, without adding substantially to the bulk of the paper.

Figure 2A:
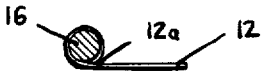
FIG. 2a is an enlarged front elevational view, partially fragmented, of a first arrangement of the wire element and cigarette paper.
Figure 2B:
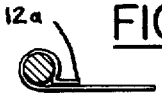
FIG. 2b is an enlarged front elevational view, partially fragmented, of a second arrangement of the wire element and cigarette paper.
Figure 2C:
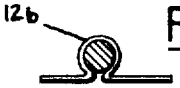
FIG. 2c is an enlarged front elevational view, partially fragmented, of a third arrangement of the wire element and cigarette paper.

Referring to FIGS. 2a, 2b, and 2c, three alternate arrangements of the wire element 16 and paper leaf 12 are shown. While not intended to be inclusive, the arrangements illustrate three preferred methods of attaching the wire element to the paper leaf. In FIG. 2a, the edge 12a of the paper leaf 12 is shown rolled and tucked around the wire element 16. While this arrangement provides the best finished leaf, it is somewhat more difficult to fabricate than the arrangement of FIG. 2b.

In FIG. 2b, the edge 12a of the cigarette leaf 12 is simply folded over the wire element 16 in an overlay. This is easily accomplished on the simplest of machinery. The arrangement of both FIGS. 2a dnd 2b are preferred for cigarette papers which are hand rolled, since the wire at the lead edge will actually aid in rolling the cigarette.

In FIG. 2c a central portion 12b of the cigarette leaf 12 is wrapped substantially around the wire element 16 in an omega configuration. This arrangement is preferred for cigarettes which are mass produced by machine.

In all three arrangements either the paper may first receive the adhesive or the wire first receives the adhesive before coupling the wire to the paper.

Figure 3:
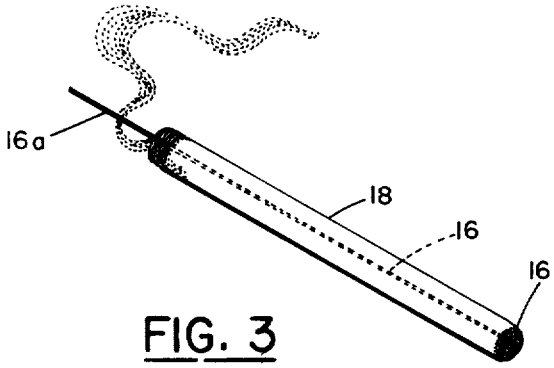
FIG. 3 is a perspective view of a partially consumed rolled cigarette with the wire element arranged longitudinally along the length of the cigarette.
Figure 4:
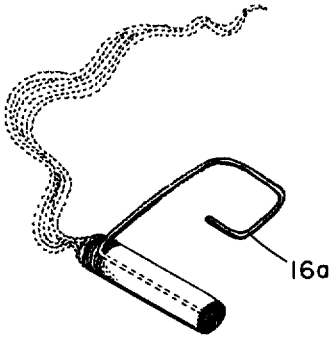
FIG. 4 is a perspective view of a partially consumed cigarette with the wire element exposed and deformed to provide a holder.
Figure 6:
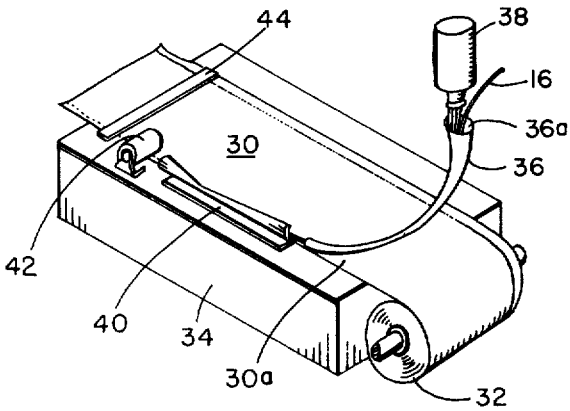
FIG. 6 is a schematic view of a means of continuous fabrication of a roll of cigarette paper with a wire element.

Referring now to FIG. 3, a rolled and filled cigarette 18 is shown with the wire element 16 running under the paper along the length of the cigarette 18. The wire element 16 initially equals the length of the cigarette for convenience of fabrication and packing. As the cigarette is consumed by smoking, the noncombustible wire element 16 becomes exposed. In FIG. 3 a short portion 16a of the wire 16 is shown exposed as a natural result of the reduction in length of the cigarette when smoked. When the exposed wire element 16 is of a substantial length, it may be grasped or preferably deformed by bending to a position substantially at right angles to the remaining cigarette as shown in FIG. 4. If desired, the end 16a of the wire can be further deformed to provide a planar configuration such as coil shown in FIG. 4 for added stability when holding the remainder of the cigarette.

Figure 5:
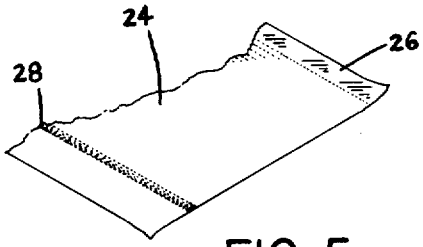
FIG. 5 is an enlarged, fragmented perspective view of a cigarette paper with an alternate support element.

Referring to FIG. 5, a conventional cigarette leaf 24 is shown with a customary gummed edge 26 along one longitudinal edge and a bead 28 of deposited material having the characteristic that a rigid or simirigid strip is created on initial deposit or after a pyric reaction to the burning ember of the cigarette. The terms rigid or semirigid are used to denote a characteristic that is evident more in utility than empirically. Essentially, the deposit must form an element, either alone or by its effect on the paper in creating an unburned strip of paper, that will function as a holder and support a partially consumed cigarette.

For example, a heat resistant polysulphide-containing plastic will function to create a supportive strip.

The schematic illustration of FIG. 5 provides a conceptual demonstration of one method of continuously integrating the wire 16 into a continuous sheet of cigarette paper 30. The cigarette paper is supplied from a supply roll 32 and transported across a bed 34. Wire 16 from a supply source (not shown) is delivered through a guide tube 36 to the bed 34 such that the wire is aligned over the cigarette paper proximate to the edge 30a of the paper, allowing approximately one eighth of an inch of paper for an overlay. A liquid adhesive from an adhesive supply 38 is supplied to the end 36a of the guide tube 36 to provide an adhesive coating to the wire as it is delivered to the cigarette paper 30. A wave form guide 40 mounted to the bed folds the edge 30a of the paper over the wire 16. A rubber idler roller 42 provides a compression force to insure a proper adhesion of the paper around the wire such that the paper is secured to the wire in the arrangement previously described with relation to FIG. 2b. The cigarette paper with integral wire leaves the bed 34 under the guide plate 44 to a conventional cutting machine (not shown).

What is claimed is:

1. A cigarette paper with an integral cigarette holder comprising a thin paper material having a substantially noncombustible, thin, elongated *wirelike* support element integrally secured to said paper, said element being longitudinally arranged along the length of a cigarette rolled with said paper, said *wirelike* element being exposed in part on consumption of the cigarette by smoking, wherein said exposed part comprises a holder means for support of the cigarette *and wherein said paper material has a length and a width and said wirelike support element is joined to the paper material longitudinally along the length and proximate an edge of the paper material.*

2. The cigarette paper of claim 1 wherein said *wirelike* support element comprises a deformable holder means for finger support of the cigarette.

[3. The cigarette paper of claim 1 wherein said paper material has a length and a width and said support element is joined to the paper material longitudinally along the length of the paper material.]

4. The cigarette paper of claim [3] *1* wherein said paper material has a first side edge and a second opposite side edge along the length and wherein said *wirelike* support element is joined to the paper material adjacent the first side edge.

5. The cigarette paper of claim 4 wherein the second side edge has a gummed surface for cigarette fabrication.

6. The cigarette paper of claim [3] *1* wherein said *wirelike* support element comprises a stainless steel wire.

[7. The cigarette paper of claim 3 wherein said support element comprises a narrow strip of deposited material on said paper material, said deposited material hardening to a substantially semirigid, noncombustible, longitudinal support strip.]

*8. A cigarette paper with an integral cigarette holder comprising a thin paper material having a substantially noncombustible, thin, elongated support element integrally secured to said paper, said element being longitudinally arranged along the length of a cigarette rolled with said paper, said element being exposed in part on consumption of the cigarette by smoking, wherein said exposed part comprises a holder means for support of the cigarette; wherein said paper material has a length and a width and said support element is joined to the paper material longitudinally along the length of the paper material; wherein said paper material has a first side edge and a second opposite side edge along the length and wherein said support element is joined to the paper material adjacent the first side edge; and, wherein said support element comprises a stainless steel wire.*

* * * * *